(12) United States Patent
Bowman

(10) Patent No.: US 6,811,514 B2
(45) Date of Patent: Nov. 2, 2004

(54) ELECTRONIC DRIVE UNIT ASSEMBLY FOR HEAVY DUTY VEHICLES

(75) Inventor: Larry W. Bowman, Troy, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 0 days.

(21) Appl. No.: 10/055,159

(22) Filed: Jan. 23, 2002

(65) Prior Publication Data

US 2003/0139250 A1 Jul. 24, 2003

(51) Int. Cl.⁷ .................. B60K 17/04; F16H 57/08
(52) U.S. Cl. .................................. 475/338; 180/372
(58) Field of Search ............................. 475/149, 338, 475/341, 342; 180/372

(56) References Cited

U.S. PATENT DOCUMENTS

| | | | | |
|---|---|---|---|---|
| 1,311,310 A | * | 7/1919 | Bouton | 475/341 |
| 3,477,547 A | * | 11/1969 | Kress et al. | 184/63 |
| 3,737,000 A | * | 6/1973 | Knobloch et al. | 475/342 |
| 4,040,312 A | * | 8/1977 | Tappan et al. | 475/342 |
| 4,056,018 A | * | 11/1977 | Chung | 74/665 P |
| 4,092,878 A | * | 6/1978 | Campbell | 475/342 |
| 4,116,293 A | * | 9/1978 | Fukui | 475/342 |
| 4,280,376 A | * | 7/1981 | Rosen | 475/342 |
| 4,330,045 A | * | 5/1982 | Myers | 180/65.5 |
| 4,532,689 A | * | 8/1985 | Harder et al. | 29/426.5 |
| 4,799,564 A | * | 1/1989 | Iijima et al. | 180/65.5 |
| 4,873,894 A | * | 10/1989 | Avery et al. | 475/342 |
| 5,087,229 A | * | 2/1992 | Hewko et al. | 475/149 |
| 5,267,915 A | | 12/1993 | Estabrook | |
| 5,356,351 A | * | 10/1994 | Hvolka | 475/331 |
| 5,397,281 A | * | 3/1995 | Forster | 475/83 |
| 5,435,794 A | * | 7/1995 | Mori et al. | 475/341 |
| 6,080,077 A | * | 6/2000 | Kamlukin | 475/149 |
| 6,104,112 A | | 8/2000 | Vanjani | |
| 6,258,006 B1 | | 7/2001 | Hanyu et al. | |

FOREIGN PATENT DOCUMENTS

| | | | |
|---|---|---|---|
| DE | 19805679 | 8/1999 | |
| EP | 1077522 | 2/2001 | |
| EP | 1 149 721 A2 | 10/2001 | |
| JP | 02011419 A | * 1/1990 | ............ B60K/7/00 |
| JP | 2001116089 | 4/2001 | |
| WO | WO01/56138 A1 | 8/2001 | |
| WO | WO01/63146 A1 | 8/2001 | |

OTHER PUBLICATIONS

Publication: Auburn Gear "Power Wheel Plus".

* cited by examiner

Primary Examiner—Tisha Lewis
(74) Attorney, Agent, or Firm—Howard & Howard

(57) ABSTRACT

An electronic drive unit assembly independently drives each drivable wheel on a heavy-duty vehicle. The drive unit assembly includes a spindle that defines an inner chamber and which is mounted to a vehicle structure. A wheel hub is mounted for rotation relative to the spindle. An electric motor is mounted within the inner chamber and has an output shaft that is operatively coupled to a reduction gear assembly that is used to drive the wheel hub. The reduction gear assembly includes an inner ring gear mounted to the spindle and an outer ring gear mounted to the wheel hub. An inner set of planet gears is in meshing engagement with the inner ring gear and an outer set of planet gears is in meshing engagement with the outer ring gear. A planetary spider assembly rigidly connects the inner and outer sets of planet gears. The inner planet gears have a different number of teeth than the outer planet gears to achieve the desired gear reduction.

15 Claims, 2 Drawing Sheets

ELECTRONIC DRIVE UNIT ASSEMBLY FOR HEAVY DUTY VEHICLES

BACKGROUND OF THE INVENTION

This invention relates to an electronic drive unit assembly for a heavy-duty vehicle and more particularly to a drive unit assembly that incorporates an electric motor into each wheel spindle to drive a deep ratio reduction gear assembly at each driven wheel end on a heavy-duty vehicle.

Gear reduction assemblies are used in many different types of vehicles to provide a desired drive torque and speed output at a vehicle wheel. Heavy-duty off-road vehicles such as lift trucks, container handlers, rough terrain cranes, front end loaders, mining trucks, log haulers, etc., often require significant reductions in order to achieve high output torque at the wheel to operate on adverse ground conditions. Traditionally, these vehicles are driven by planetary axles that include planetary gear reduction assemblies.

Planetary axles include a center axle housing with wheel ends mounted at each end of the housing. A center carrier is enclosed within the axle housing and is coupled to an input from a vehicle engine and transmission. The carrier drives a pair of axle shafts that extend to each wheel end. Each wheel end includes a planetary gear reduction assembly that is driven by one of the axle shafts.

A typical planetary gear reduction assembly includes an internally toothed ring gear, a sun gear that is centrally positioned within the ring gear, and a plurality of planet gears in meshing engagement with both the sun and ring gears. The sun gear is driven by an axle shaft and the reaction between the sun, planet, and ring gears results in rotation of the wheel at a desired speed and torque.

One disadvantage with this traditional planetary gear configuration is that deep gear reductions, such as 200:1, are not available at the wheel end due to packaging constraints. Also, planetary axles for heavy duty vehicles are heavy and require powerful engines that generate pollutants, which are undesirable. As the industry moves toward lower emission requirements, alternative ways to power heavy-duty off-road vehicles are being explored.

Accordingly, it is desirable to provide a drive unit assembly that reduces emissions, reduces weight, and which provides a wider range of deep gear reductions, as well as overcoming the other deficiencies in the art outlined above.

SUMMARY OF THE INVENTION

An electronic drive unit assembly independently drives each driven wheel on a heavy-duty vehicle. Each electronic drive unit assembly includes an electric motor mounted within a spindle that is mounted to a vehicle structure such as the frame or suspension. The motor is mounted within a chamber formed inside the spindle and is protected from external contaminants. A wheel hub is mounted for rotation relative to the spindle and is driven by the motor. The motor has an output shaft that is concentric with the wheel. The output shaft is coupled to a reduction gear assembly that produces a desired output torque at the wheel, and which is operatively coupled to drive the wheel hub.

In the preferred embodiment, the reduction gear assembly is a deep ratio gear reduction assembly that is compatible with a high-speed electric motor to produce a desired wheel output torque and speed. The gear reduction assembly includes an inner ring gear that is mounted to the spindle and an outer ring gear that is mounted to or formed within the wheel hub. The reduction gear assembly further includes a plurality of inner planet gears that are in meshing engagement with the inner ring gear and a plurality of outer planet gears that are in meshing engagement with the outer ring gear. A planetary spider assembly interconnects the inner and outer planet gears such that each one of the inner planet gears is paired with one of the outer planet gears. The inner and outer planet gears in each pair are rigidly mounted on a common pinion shaft fixed to a spider body such that the inner and outer planet gears turn with the spider at the same speed about an axis of rotation. The inner planet gears have a first predetermined number of teeth and the outer planet gears have a second predetermined number of teeth that is different than the first predetermined number of teeth to achieve the desired gear reduction ratio.

In one embodiment, the motor indirectly drives the planetary spider assembly via a sun gear configuration. A sun gear is operatively coupled to the motor output shaft and is in meshing engagement with the inner planet gears, which are in meshing engagement with the inner ring gear. The sun gear drives the inner planet gears, which drive the planetary spider, resulting in the outer planet gears driving the outer ring gear.

In another embodiment, the motor directly drives the planetary spider assembly. The planetary spider includes a spider body with a central bore and a plurality of radial bores for mounting the pinion shafts. The output shaft is in driving engagement with the spider body via the central bore. As the spider body rotates, the inner planet gears react against the inner ring gear and the outer planet gears react against the outer ring gear to rotate the wheel hub.

The subject invention provides a drive unit assembly that reduces emissions by providing electric drive at each driven wheel, reduces weight by eliminating the need for a planetary axle assembly, and which provides a wider range of deep gear reductions. These and other features of the present invention can be best understood from the following specifications and drawings, the following of which is a brief description.

DETAILED DESCRIPTION OF A PREFERRED EMBODIMENT

Figure 1:
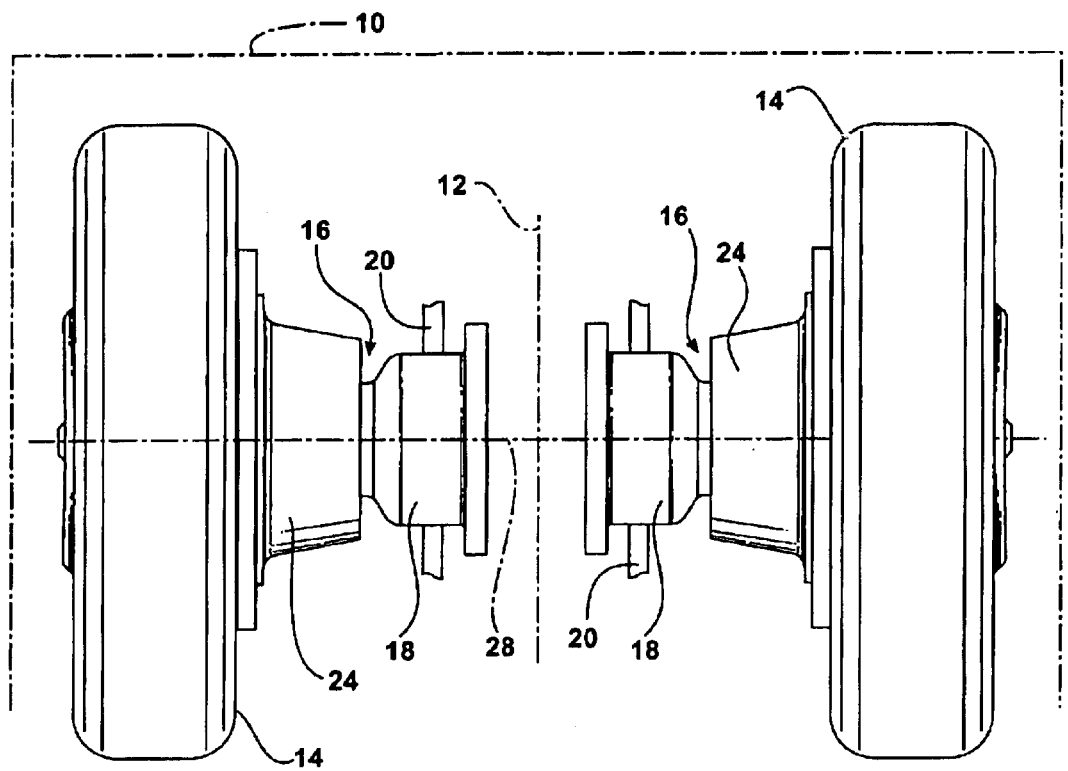
FIG. 1 is schematic view of a pair of driven wheels on a heavy-duty vehicle, which include the subject drive unit assembly.

As shown in FIG. 1, a heavy-duty vehicle 10 defines a longitudinal vehicle axis 12 and includes at least two (2) driven wheels 14 positioned across from each other on opposing sides of the longitudinal vehicle axis 12. A drive unit assembly 16 independently drives each wheel 14.

Figure 2:
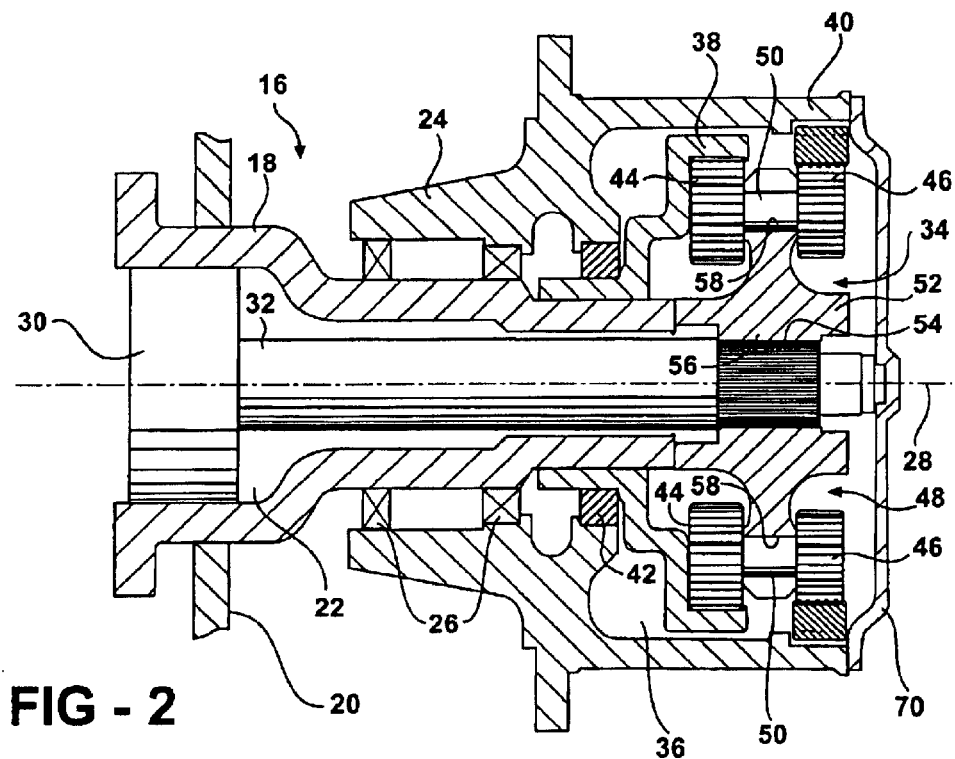
FIG. 2 is a schematic cross-sectional view of one embodiment of the drive unit assembly of FIG. 1.

The drive unit assembly 16 is shown in greater detail in FIG. 2. The drive unit assembly 16 includes a non-rotating spindle 18 that is mounted to a vehicle structure or component 20 such as a vehicle frame or suspension member. The spindle 18 includes a hollow portion that defines an inner chamber 22. A wheel hub 24 is mounted on bearings 26 for rotation relative to the spindle 18 about an axis of rotation 28. An electric motor 30 is mounted within the chamber 22 in such a manner that the motor 30 is protected from external contaminants from the environment. The electric motor 30 includes an output shaft 32 that is operatively coupled to drive the wheel hub 24 about the axis of rotation 28. Any type of electric motor known in the art can be used in this application.

A reduction gear assembly, shown generally at 34, is included within the drive unit assembly 16 to provide a desired gear reduction at each wheel. The subject reduction gear assembly 34 is capable of providing reduction within the range of 20 to 200:1. The unique reduction gear assembly 34 is configured to provide high reduction capability such that operation with high-speed electric motors 30 can be achieved. The reduction gear assembly 34 is preferably positioned within a chamber 36 formed within the wheel hub 24. The reduction gear assembly 34 includes an input that is operatively coupled to the motor output shaft 32 and an output that is operatively coupled to the wheel hub 24.

The reduction gear assembly 34 includes an inner ring gear 38 that is mounted to the spindle 18 and an outer ring gear 40 that is mounted to or formed within the wheel hub 24. The inner 38 and outer 40 ring gears are preferably mounted as separate pieces onto their respective components, however, the inner 38 and outer 40 ring gears could be integrally formed with their respective components as one piece. The inner ring gear 38 is a non-rotating component and is mounted at least partially within the inner chamber 36 of the wheel hub 24. A seal 42 is mounted between the hub 24 and the inner ring gear 38 to provide a seal-tight enclosure for the inner chamber 36.

A first plurality of inner planet gears 44 are in meshing engagement with the inner ring gear 38 and a second plurality of outer planet gears 46 are in meshing engagement with the outer ring gear 40. A planetary spider assembly 48 interconnects the inner 44 and outer 46 planet gears such that each one of the inner planet gears 44 is paired with one of the outer planet gears 46. Preferably, there are three gears in each inner and outer planet gear set to form three pairs, however, additional inner 44 and outer 46 planet gears could also be included in the reduction gear assembly 34. The inner 44 and outer 46 planet gears in each pair are rigidly mounted on a common pinion shaft 50 that is fixed to a spider 52 such that the inner 44 and outer 46 planet gears turn with the spider 52 at the same speed about the axis of rotation 28.

The inner planet gears 44 each have a first predetermined number of teeth and the outer planet gears 46 each have a second predetermined number of teeth that is different than the first predetermined number of teeth to achieve the desired gear reduction ratio. The number of teeth on any of the gears 44, 46 in the reduction gear assembly 34 can be varied to achieve a desired gear ratio as is known in the art and thus will not be discussed in further detail.

In the configuration in FIG. 2, the motor 30 directly drives the spider assembly 48. The spider 52 includes a central bore 54 that surrounds one end of the output shaft 32 and has a plurality of bores 58 formed radially about the central bore 54 for supporting the pinion shafts 50. Preferably, the spider 52 is in direct driving engagement with the output shaft 32 via a spline mount 56. While a splined configuration is preferred, other similar connecting methods known in the art could also be used.

The spider 52, inner ring gear 38, outer ring gear 40, and motor output shaft 32 are all mounted in a concentric configuration. The output shaft 32 drives the spider 52, which drives the inner 44 and outer 46 planet gears via the pinion shafts 50. The inner planet gears 44 react against the inner ring gear 38 and the outer planet gears 46 react against the outer ring gear 40 to drive the wheel 14. A hubcap 70 or other similar cover is mounted to one end of the hub 24 to enclose the chamber 36.

Figure 3:
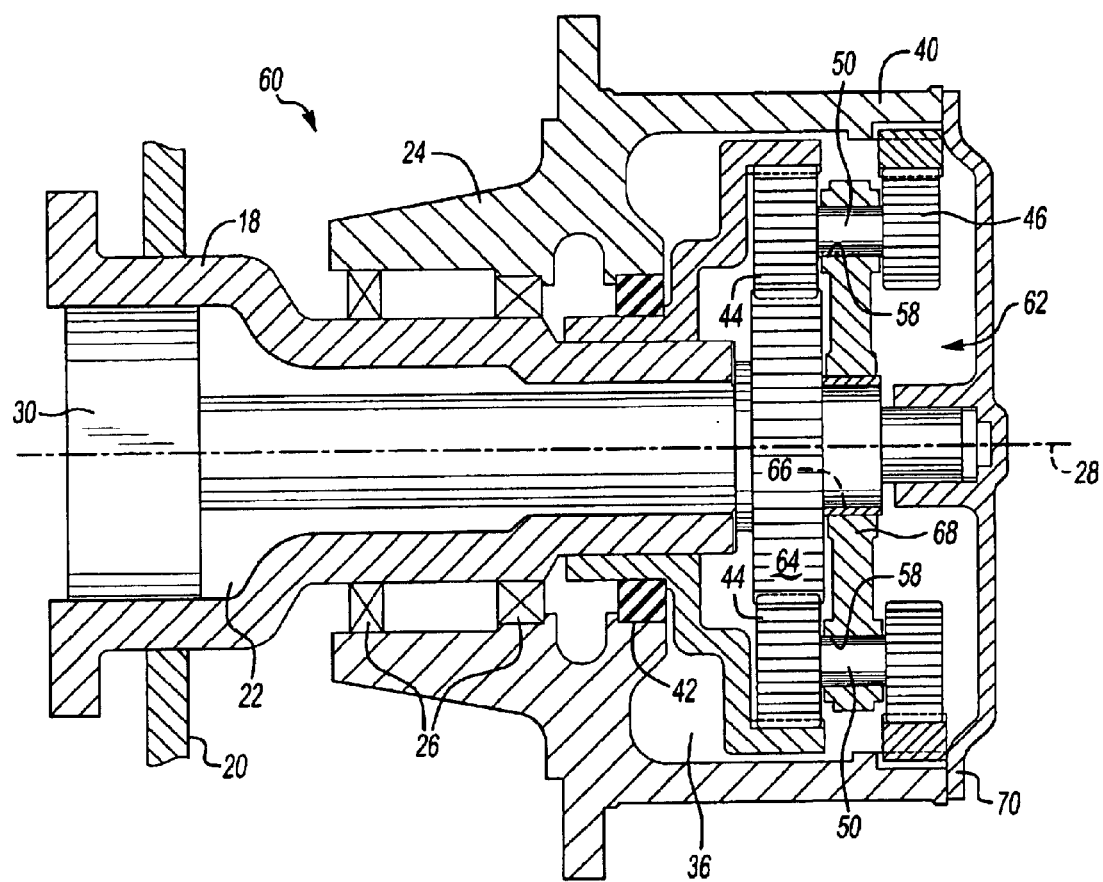
FIG. 3 is a schematic cross-sectional view of an alternate embodiment of the drive unit assembly of FIG. 1.

An alternate wheel end assembly 60 with a spider indirect drive assembly 62 is shown in FIG. 3. This configuration is similar to the configuration shown in FIG. 2 except that the spider assembly 62 of FIG. 3 is indirectly driven by the motor 30. A sun gear 64 is in direct driving engagement with the output shaft 32 and is in meshing engagement with the inner planet gears 44. The sun gear 64 can be mounted on the shaft 32 as a separate piece or can be integrally formed with the shaft 32 as a single piece. A bushing 66 is mounted on one end of the shaft 32 such that the spider assembly 62 can rotate relative to the sun gear 62, i.e. the sun gear 64 and spider assembly 62 can rotate at different speeds. The spider assembly 62 includes a spider 68 that supports the pinion shafts 50 as described above.

The motor output shaft 32 drives the sun gear 64, which drives the inner planet gears 44. The inner planet gears 44 react against the inner ring gear 38, which drives the spider 62 and the associated outer planet gears 46. The outer planet gears 46 react against the outer ring gear 40 to drive the wheel 14.

The subject invention provides a drive unit assembly that reduces emissions by providing electric drive at each driven wheel, reduces weight by eliminating the need for a planetary axle assembly, and which provides a wider range of deep gear reductions. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An electronic drive unit assembly for a heavy-duty vehicle comprising:
    a non-rotating spindle having an interior spindle chamber;
    a wheel hub supported on at least one bearing for rotation relative to said spindle about an axis of rotation with said wheel hub defining an interior hub chamber;
    an inner ring gear mounted to said spindle and an outer ring gear mounted to said wheel hub;
    an electric motor mounted within said spindle chamber and having an output shaft operatively coupled to drive said wheel hub about said axis of rotation;
    a spider directly supported on said output shaft of said motor for rotation about said axis of rotation, said spider including a plurality of bores; and
    a plurality of planet gear sets spaced from said output shaft and mounted to said spider with each of said planet gear sets having a pinion shaft supported in a corresponding bore, an inner planet gear mounted to one end of said pinion shaft, and an outer planet gear mounted to an opposite end of said pinion shaft wherein said inner planet gears are in meshing engagement with said inner ring gear and said outer planet gears are in meshing engagement with said outer ring gear to define said operative coupling of said output shaft to said wheel hub.

2. An electronic drive unit assembly according to claim 1 wherein said inner ring gear, said outer ring gear, said spider, and said planet gear sets define a reduction gear assembly mounted within said wheel hub.

3. An electronic drive unit assembly according to claim 1 wherein said inner and outer planet gears rotate at a common speed about a corresponding pinion shaft.

4. An electronic drive unit assembly according to claim 3 wherein said inner planet gears have a first predetermined number of gear teeth and said outer planet gears have a second predetermined number of gear teeth that is different than said first predetermined number of gear teeth.

5. An electronic drive unit assembly according to claim 1 further including a sun gear mounted for rotation with said output shaft of said motor wherein said inner planet gears are in meshing engagement with said sun gear.

6. An electronic drive unit assembly according to claim 5 wherein said spider is rotatably supported on a bearing surface such that said sun gear and said spider can rotate at different speeds relative to each other.

7. An electronic drive unit assembly according to claim 5 wherein said inner ring gear, said sun gear, said spider, and said outer ring gear are concentric.

8. An electronic drive unit assembly according to claim 1 wherein said spider in driving engagement with said output shaft of said motor such that each planet gear set rotates with said spider about said axis of rotation.

9. An electronic drive unit assembly according to claim 8 wherein said inner ring gear, said spider, and said outer ring gear are concentric.

10. An electronic drive unit assembly for a heavy-duty vehicle comprising:

a non-rotating spindle mounted to a vehicle structural component, said spindle defining an interior spindle chamber;

a wheel hub supported on at least one bearing for rotation relative to said spindle about an axis of rotation, said wheel hub defining an interior hub chamber;

a reduction gear assembly mounted within said hub chamber, said reduction gear assembly having an inner ring gear mounted to said spindle and operatively coupled to an input and an outer ring gear mounted to said wheel hub to define an output;

said reduction gear assembly further including a plurality of inner gears in meshing engagement with said inner ring gear and a plurality of outer gears in meshing engagement with said outer ring gear with each one of said inner gears having a corresponding outer gear to form a plurality of gear pairs and wherein said inner and outer gears in each of said gear pair are rigidly mounted to a common shaft; and an electric motor mounted within said interior spindle chamber and having a motor output shaft operatively coupled to said input to rotate said plurality of gear pairs to drive said wheel hub about said axis of rotation.

11. An electronic drive unit assembly according to claim 10 wherein said inner gears have a first predetermined number of gear teeth and said outer gears have a second predetermined number of gear teeth that is different than said first predetermined number of gear teeth.

12. An electronic drive unit assembly according to claim 11 wherein said input comprises a sun gear mounted for rotation with said output shaft and in meshing engagement with said inner gears.

13. An electronic drive unit assembly according to claim 12 including a spider that supports said shafts from each of said gear pairs to rigidly connect said inner gears to said outer gears such that each gear pair rotates with said spider about said axis of rotation.

14. An electronic drive unit assembly according to claim 13 wherein said spider is rotatably supported on a bearing surface such that said sun gear and said spider can rotate at different speeds relative to each other.

15. An electronic drive unit assembly according to claim 10 wherein said input comprises a spider in direct driving engagement with said output shaft, said spider supporting said common shafts such that each gear pair rotates with said spider about said axis of rotation.

* * * * *